(12) United States Patent
Van Maanen et al.

(10) Patent No.: US 12,109,881 B2
(45) Date of Patent: Oct. 8, 2024

(54) MODULAR ELECTRIC VEHICLE DRIVE MODULE

(71) Applicant: BorgWarner Inc., Auburn Hills, MI (US)

(72) Inventors: Keith Van Maanen, Bloomfield Hills, MI (US); Chengyun Guo, Novi, MI (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 17/980,736

(22) Filed: Nov. 4, 2022

(65) Prior Publication Data

US 2024/0149667 A1    May 9, 2024

(51) Int. Cl.
| | |
|---|---|
| *B60K 17/12* | (2006.01) |
| *B60K 1/02* | (2006.01) |
| *B60K 7/00* | (2006.01) |
| *B60K 17/04* | (2006.01) |
| *B60K 17/16* | (2006.01) |
| *B60K 17/22* | (2006.01) |
| *H02K 7/00* | (2006.01) |

(52) U.S. Cl.
CPC ............ *B60K 17/12* (2013.01); *B60K 17/046* (2013.01); *B60K 17/16* (2013.01); *B60K 17/22* (2013.01); *B60K 1/02* (2013.01); *B60K 2007/0061* (2013.01); *H02K 7/003* (2013.01)

(58) Field of Classification Search
CPC ........ B60K 17/12; B60K 17/16; B60K 17/22; B60K 2007/0061; B60K 1/02; B60K 17/046; H02K 7/003
See application file for complete search history.

(56) References Cited

U.S. PATENT DOCUMENTS

| | | | | |
|---|---|---|---|---|
| 5,011,458 | A | * | 4/1991 | Kumm ................ F16H 37/0846 477/41 |
| 8,939,858 | B2 | * | 1/2015 | Puiu ....................... B60K 6/445 475/275 |
| 8,992,366 | B2 | | 3/2015 | Gassmann |

(Continued)

FOREIGN PATENT DOCUMENTS

| | | |
|---|---|---|
| CN | 202463569 U | 10/2012 |
| DE | 102018116319 A1 | 1/2020 |

(Continued)

OTHER PUBLICATIONS

CN202463569—machine translation (Ping Oct. 3, 2012).*

(Continued)

*Primary Examiner* — Tinh Dang
(74) *Attorney, Agent, or Firm* — Reising Ethington P.C.

(57) ABSTRACT

A vehicular drive unit for a battery electric vehicle (BEV) includes an electric motor, for propelling the BEV, having an output shaft; a planetary gearbox, having an input and an output; a sprocket coupled to an output of the electric motor or an input of the planetary gearbox; and an endless loop rotatably coupled with the sprocket and the input of the planetary gearbox thereby configured to transmit rotational movement of the output shaft of the electric motor to a drive shaft of the BEV, wherein an axis of rotation of the drive shaft of the BEV is offset from an axis of rotation of the output shaft of the electric motor.

4 Claims, 6 Drawing Sheets

(56) References Cited

U.S. PATENT DOCUMENTS

| | | | |
|---|---|---|---|
| 9,453,564 B1* | 9/2016 | Pritchard | B60K 1/00 |
| 10,081,239 B2* | 9/2018 | Janson | B60K 6/40 |
| 10,112,472 B2* | 10/2018 | Sugiyama | F16H 3/728 |
| 10,174,828 B2 | 1/2019 | Keller et al. | |
| 10,744,865 B2* | 8/2020 | Janson | B60K 6/40 |
| 10,808,814 B2* | 10/2020 | Zhong | F16H 37/02 |
| 10,920,859 B2 | 2/2021 | Conlon et al. | |
| 11,192,436 B1* | 12/2021 | Puiu | B60K 7/0007 |
| 2007/0117669 A1 | 5/2007 | Garnett et al. | |
| 2008/0230284 A1 | 9/2008 | Schoon | |
| 2008/0230289 A1* | 9/2008 | Schoon | B60K 1/02 |
| | | | 180/65.6 |
| 2009/0229897 A1* | 9/2009 | Yutani | B60W 10/06 |
| | | | 180/65.265 |
| 2018/0058557 A1* | 3/2018 | Janson | B60K 6/365 |
| 2018/0201114 A1* | 7/2018 | Oh | B60K 6/48 |
| 2019/0118639 A1 | 4/2019 | Hata et al. | |
| 2019/0120350 A1* | 4/2019 | Zhong | B60K 1/00 |
| 2020/0256465 A1 | 8/2020 | Gassmann et al. | |
| 2020/0282827 A1* | 9/2020 | Kaltenbach | B60K 17/06 |
| 2021/0164193 A1 | 6/2021 | Bebeti et al. | |
| 2022/0363115 A1* | 11/2022 | Baillie | F16H 48/06 |

FOREIGN PATENT DOCUMENTS

| | | | | |
|---|---|---|---|---|
| EP | 3750728 A1 | * | 12/2020 | B60K 1/00 |
| JP | 2014084000 A | | 5/2014 | |
| WO | WO2019120803 A1 | | 6/2019 | |

OTHER PUBLICATIONS

International Search Report for International Application No. PCT/US2023/036838 dated Feb. 29, 2024 (3 pages).

Written Opinion for International Application No. PCT/US2023/036838 dated Feb. 29, 2024 (7 pages).

* cited by examiner

MODULAR ELECTRIC VEHICLE DRIVE MODULE

TECHNICAL FIELD

The present application relates to battery electric vehicles (BEVs) and, more particularly, to vehicular drive units for BEVs.

BACKGROUND

Modern vehicles are increasingly using electric motors as a primary source of propulsion. These vehicles—commonly referred to as battery electric vehicles (BEVs)—include a traction motor, a gearbox, a battery, and power electronics for regulating the supply of electrical current to the traction motor. In passenger vehicles for personal use, the location of these components may not differ much from one vehicle to another so the components can be positioned in a defined location in each of the vehicles produced. However, commercial vehicles often vary greatly in their configuration and design depending on their ultimate use. Given this variety, it would be helpful to have additional flexibility to select the location of the electric motor(s) and gearboxes within the vehicle so that space is most efficiently used depending on the particular configuration. It would be helpful to have a modular electric motor and gearbox assembly that can be coupled with a vehicle chassis to propel the BEV.

SUMMARY

In one implementation, a vehicular drive unit for a battery electric vehicle (BEV) includes an electric motor, for propelling the BEV, having an output shaft; a planetary gearbox, having an input and an output; a sprocket coupled to an output of the electric motor or an input of the planetary gearbox; and an endless loop rotatably coupled with the sprocket and the input of the planetary gearbox thereby configured to transmit rotational movement of the output shaft of the electric motor to a drive shaft of the BEV, wherein an axis of rotation of the drive shaft of the BEV is offset from an axis of rotation of the output shaft of the electric motor.

In another implementation, a vehicular drive unit for a BEV includes an electric motor, for propelling the BEV, having an output shaft; a planetary gearbox, having an input axially coupled with the output shaft of the electric motor, and an output; a second planetary gearbox having an input, and an output that is configured to be coupled with a drive shaft of the BEV; and an endless loop rotatably coupled with the output of the planetary gearbox and the input of the second planetary gearbox, such that the drive shaft of the BEV is offset from the output shaft of the electric motor.

In yet another implementation, a vehicular drive unit for a BEV includes an electric motor, for propelling the BEV, having an output shaft; a planetary gearbox, having an input axially coupled with the output shaft of the electric motor, and an output; an endless loop rotatably coupled with the output of the planetary gearbox and a differential of the BEV, such that the differential of the BEV is offset from the shaft of the electric motor.

DETAILED DESCRIPTION

A vehicular drive unit for a battery electric vehicle (BEV) includes an electric motor, for propelling the BEV, having an output shaft. The vehicular drive unit also includes at least one planetary gearbox, having an input axially coupled with the output shaft of the electric motor, and an output. An endless loop is rotatably coupled with the output of the planetary gearbox and an axle shaft of the BEV, such that the axis of rotation of an axle shaft of the BEV is offset from the axis of rotation of the output shaft of the electric motor. The vehicular drive unit can be flexibly combined with a commercial vehicle such that the vehicle can be customized depending on the application. That is, the location of the vehicular drive unit can be selected, and position of the electric motors relative to the planetary gearboxes and/or the axle shafts of the BEVs can be specified and altered, depending on the desired configuration of the vehicle.

Figure 1:
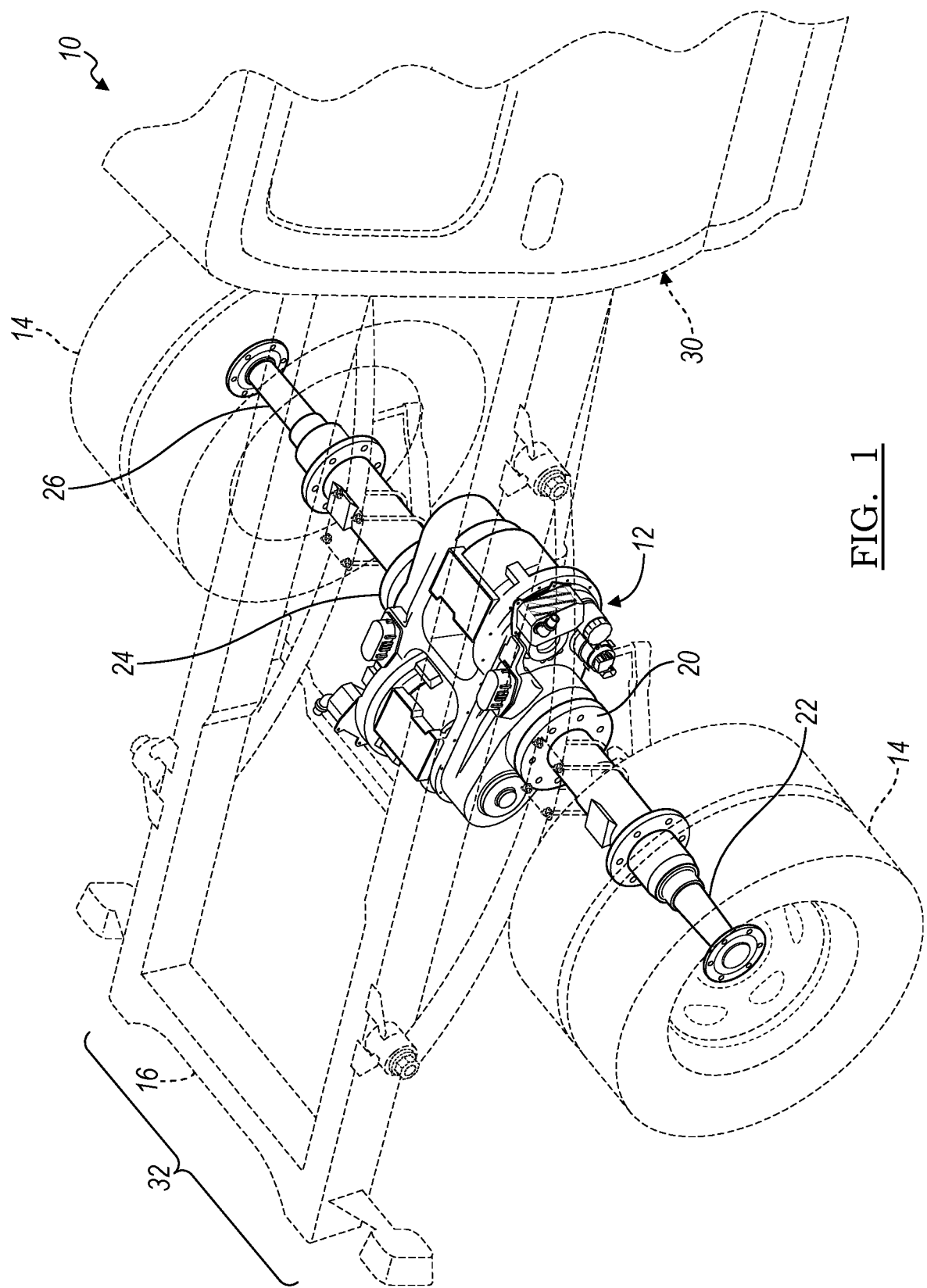
FIG. 1 is a perspective view depicting an implementation of a battery electric vehicle (BEV) and a vehicular drive unit.
Figure 2:
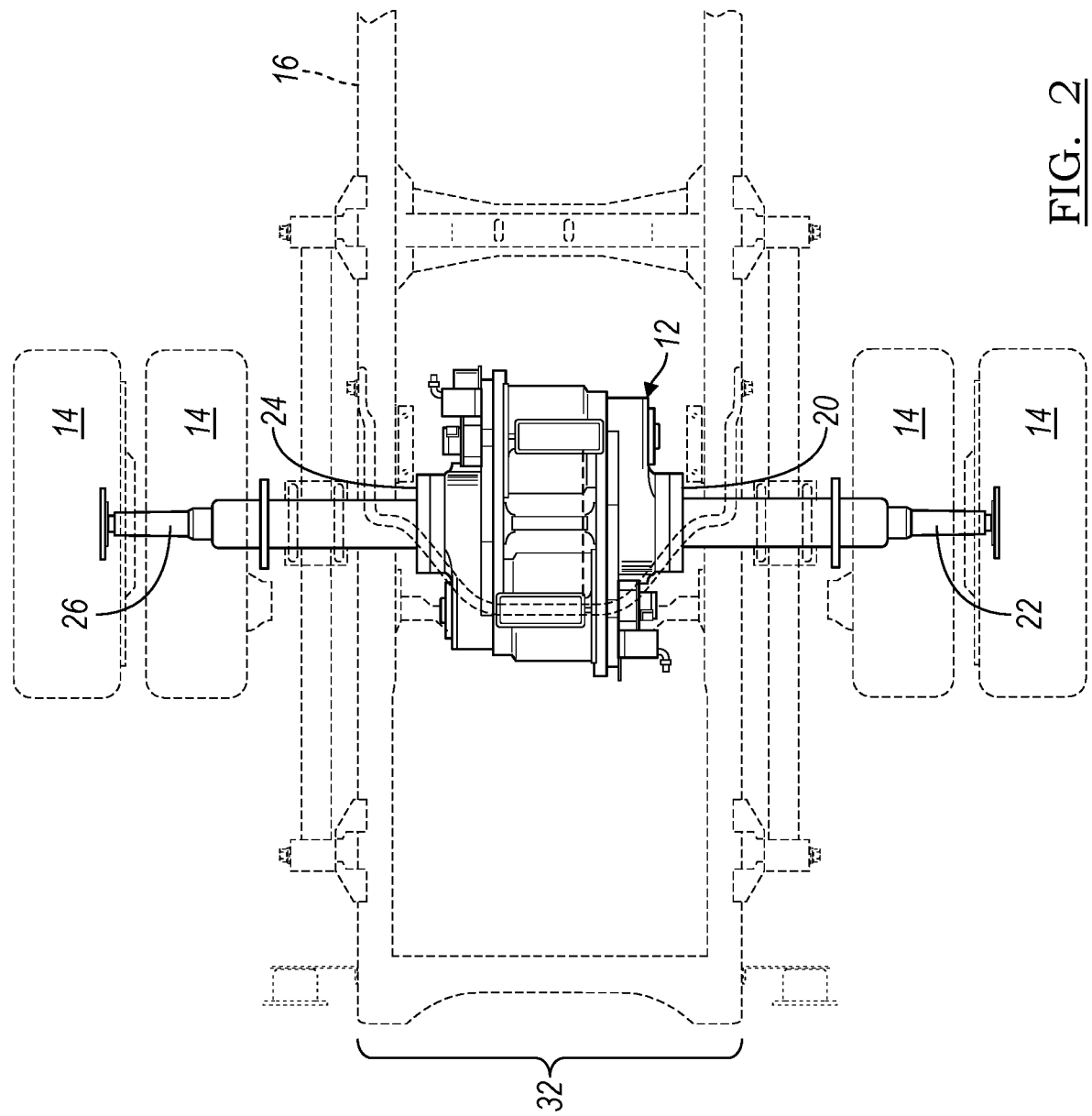
FIG. 2 is another perspective view depicting an implementation of the BEV and a vehicular drive unit.
Figure 3:
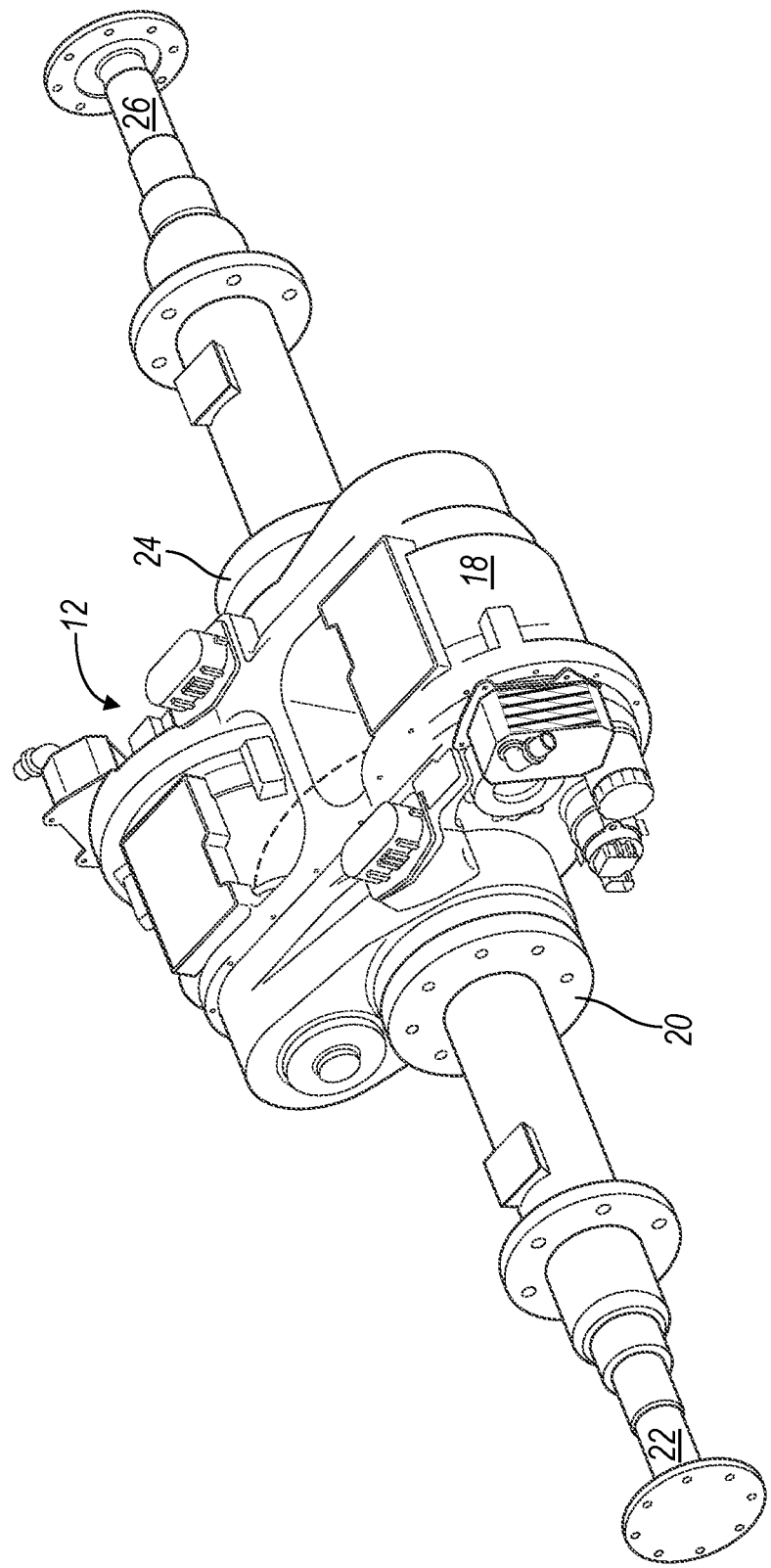
FIG. 3 is another perspective view depicting an implementation of a vehicular drive unit.

FIGS. 1-3 depicts a battery electric vehicle (BEV) 10 having a vehicular drive unit 12. The vehicular drive unit 12 can be positioned in between two wheels 14 of the BEV 10 and coupled with its frame 16. The vehicular drive unit 12 can include a housing 18 and a first output 20 that couples with a first driveshaft 22 and a second output 24 that couples with a second driveshaft 26. The first driveshaft 22 can couple to one wheel 14 of the vehicle 10 and the second driveshaft 26 can couple to another wheel of the vehicle. Typically, BEVs include a vehicle battery, at least one electric motor, and power control modules that regulate electrical current supplied to the electric motor(s) from the vehicle battery. The electric motor(s) are mechanically coupled to the wheels 14 of the BEV 10 so that the motor(s) solely or at least partially propel the BEV 10. It should be understood that the term "electric motor" can refer to rotary electric machines having a rotor assembly and a stator assembly that receives stator windings. The stator windings can receive electrical current that induces the angular displacement of the rotor assembly relative to the stator assembly. The electric motor can also act as a generator in which torque applied to the rotor assembly can induce the flow of electric current in the stator windings.

In this implementation, the BEV 10 can be a commercial vehicle that can be manufactured by an original equipment manufacturer (OEM) but may be later customized or configured for a specific commercial purpose. In one example, the BEV 10 can have a frame 16, an enclosure 30 where an operator or passengers sit, and a cargo area 32 where a box for carrying cargo can be attached by an aftermarket manufacturer. One example of a commercial vehicle is an F-450 manufactured by the Ford Motor Company. Commercial vehicles can also be described as vehicles that have a gross vehicle weight greater than 10,000 pounds, is designed or used to transport more than nine people for compensation, or is designed or used to transport more than fifteen people. However, it is possible to use the vehicular drive unit described herein in non-commercial BEVs.

Figure 4:
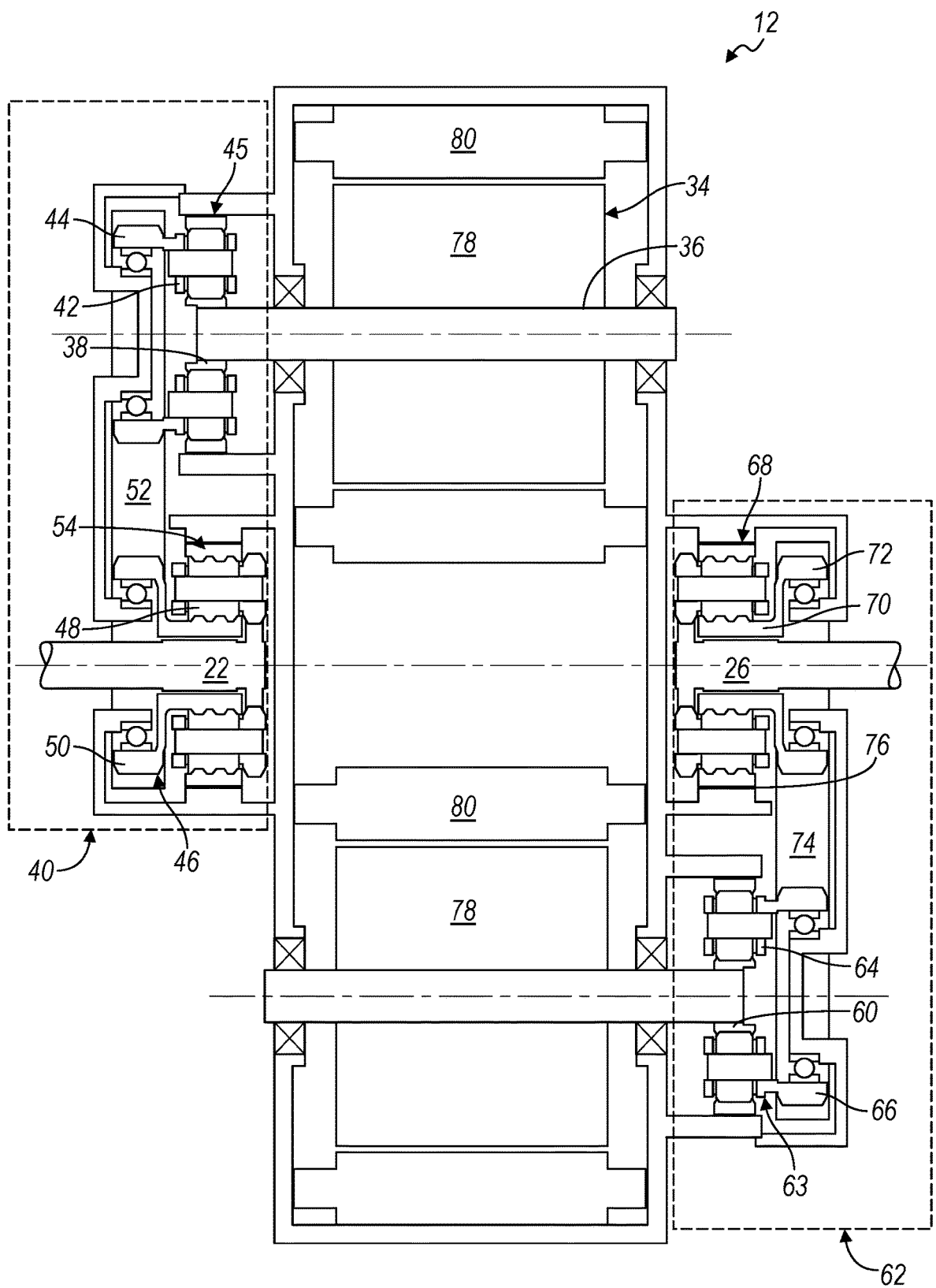
FIG. 4 is a cross-sectional view of an implementation of a vehicular drive unit.

Turning to FIG. 4, an implementation of the vehicular drive unit 12 is shown in more detail. The vehicular drive unit 12 includes a first electric motor 34 with an output shaft 36 coupled to an input 38 of a first planetary gearbox 40. The input 38 can be a sun gear having radially-outwardly facing gear teeth. The first planetary gearbox 40 can have a first planetary gearset 45 with an output 42 that is coupled to an input sprocket 44 and a mechanical link to the input 38. The output 42 can include a plurality of planet gears engaging the sun gear. A second planetary gearset 46 can include an input 48 coupled to an output sprocket 50. The input 48 can be a sun gear similar to input 38. The input sprocket 44 and output sprocket 50 can be rotatably linked by an endless loop 52, such as a belt or a chain. An output 54 of the second planetary gearset 46 can be coupled to the first driveshaft 22 that drives a wheel 14 of the BEV 10. The output 54 can include a plurality of planet gears engaging the sun gear.

The vehicular drive unit 12 can also include a second electric motor 56 with an output shaft 58 coupled to an input 60 of a second planetary gearbox 62. The input 60 can be a sun gear having radially-outwardly facing gear teeth. The second planetary gearbox 62 can include a first planetary gearset 63 and a second planetary gearset 68. The first planetary gearset 63 can have an output 64 that is coupled to an input sprocket 66. The output 64 can include a plurality of planet gears engaging the sun gear. The second planetary gearset 68 can include an input 70 coupled to an output sprocket 72. The input sprocket 66 and output sprocket 72 can be rotatably linked by a second endless loop 74, such as a belt or a chain. An output 76 of the second planetary gearbox 68 can be coupled to the second driveshaft 26 that drives another wheel 14 of the BEV 10.

The electric motors 34, 56 of the vehicular drive unit 12 generally include a rotor 78 and a stator 80 having electrical windings capable of receiving electrical current regulated by the power control modules. In one implementation, the electric motor 34, 56 can be a permanent magnet traction motor such that the rotor 78 includes permanent magnets and the electrical current flowing through electrical windings of the stator 80 are regulated by a power control module in such a way that it induces angular displacement of the stator relative to the rotor 78. The output shaft 36, 58 can be coupled with the rotor 78 in a way that prevents the angular displacement of the output shaft 36, 58 relative to the rotor 78. The rotor 78 is then angularly displaced relative to the stator 80. The power control module can include inverters that regulate the supply of the electrical current through the windings.

The planetary gearboxes and/or the sprockets can be sized and geared to establish a desired gear ratio. For example, the planetary gearsets 45, 46, 63, 68 can each include a sun gear 82 having radially-outwardly-extending gear teeth that engage one or more planetary gears 84 that also have radially-outwardly-extending gear teeth. The diameter of the sun/planetary gears as well as the size and quantity of the radially-outwardly-facing gear teeth can be chosen to create a particular gear ratio. The input sprocket 44, 66 and the output sprocket 50, 72 can include radially-outwardly-facing gear teeth that engage the endless loop 52, 74. The output shaft 36, 58 of the electric motor 34, 56 can rotate the input of the planetary gearset 45, 63 thereby transmitting that rotation to the output of the gearbox 42, 64. The output 42, 64, coupled to the input sprocket 44, 66, can communicate the motion through the endless loop 52, 74 to the input sprocket 50, 72 and the input 48, 70 of the second planetary gearbox 46, 68. The output 54, 76 of the second planetary gearbox 46, 68 can then communicate the rotation to the driveshaft 22, 26. The diameter of the input sprocket and the input sprocket can be chosen, along with the design of the sun/planetary gears, to create a particular gear ratio. The endless loop can be implemented in any one of a variety of ways. For example, the endless loop could be a chain comprising a plurality of links or the endless loop could be a belt that engages the output and input sprocket.

Figure 5:
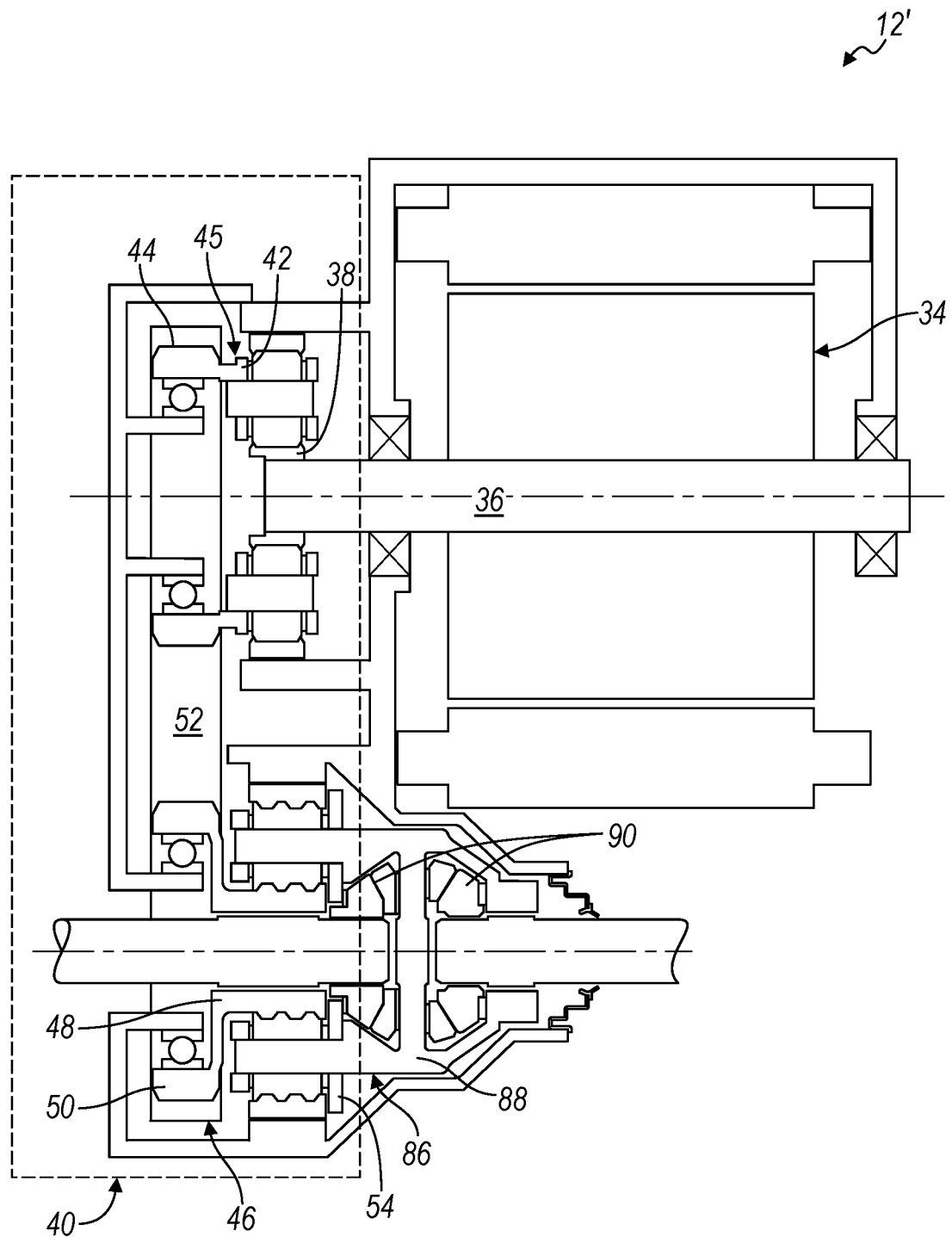
FIG. 5 is a cross-sectional view of another implementation of a vehicular drive unit.

Turning to FIG. 5, another implementation of a vehicular drive unit 12' is shown. The vehicular drive unit 12' includes one electric motor 34, a first planetary gearbox 40 having a first planetary gearset 45 and a second planetary gearset 46, an endless loop 52, and a differential 86. The differential 86 can be coupled to two or more wheels 14 of the BEV 10 and transmit rotational torque from the electric motor 34 to the wheels 14. The output shaft 36 of the electric motor 34 can be coupled to the input 38 of the first planetary gearset 45. The first planetary gearset 45 can have an output 42 that is coupled to an input sprocket 44. The second planetary gearbox 46 can include an input 48 coupled to an output sprocket 50. The input sprocket 44 and output sprocket 50 can be rotatably linked by the endless loop 52, such as a belt or a chain. The output 54 of the second planetary gearbox 46 can be coupled to the differential 86. The differential 86 can include an input 88 that couples to the output 54 of the second planetary gearbox 46 and outputs 90 that ultimately connect to the wheels 14 of the BEV 10. Differentials can be implemented in a variety of ways but typically includes a plurality of gears that permit one wheel of the BEV to rotate at a different angular speed than another wheel.

Figure 6:
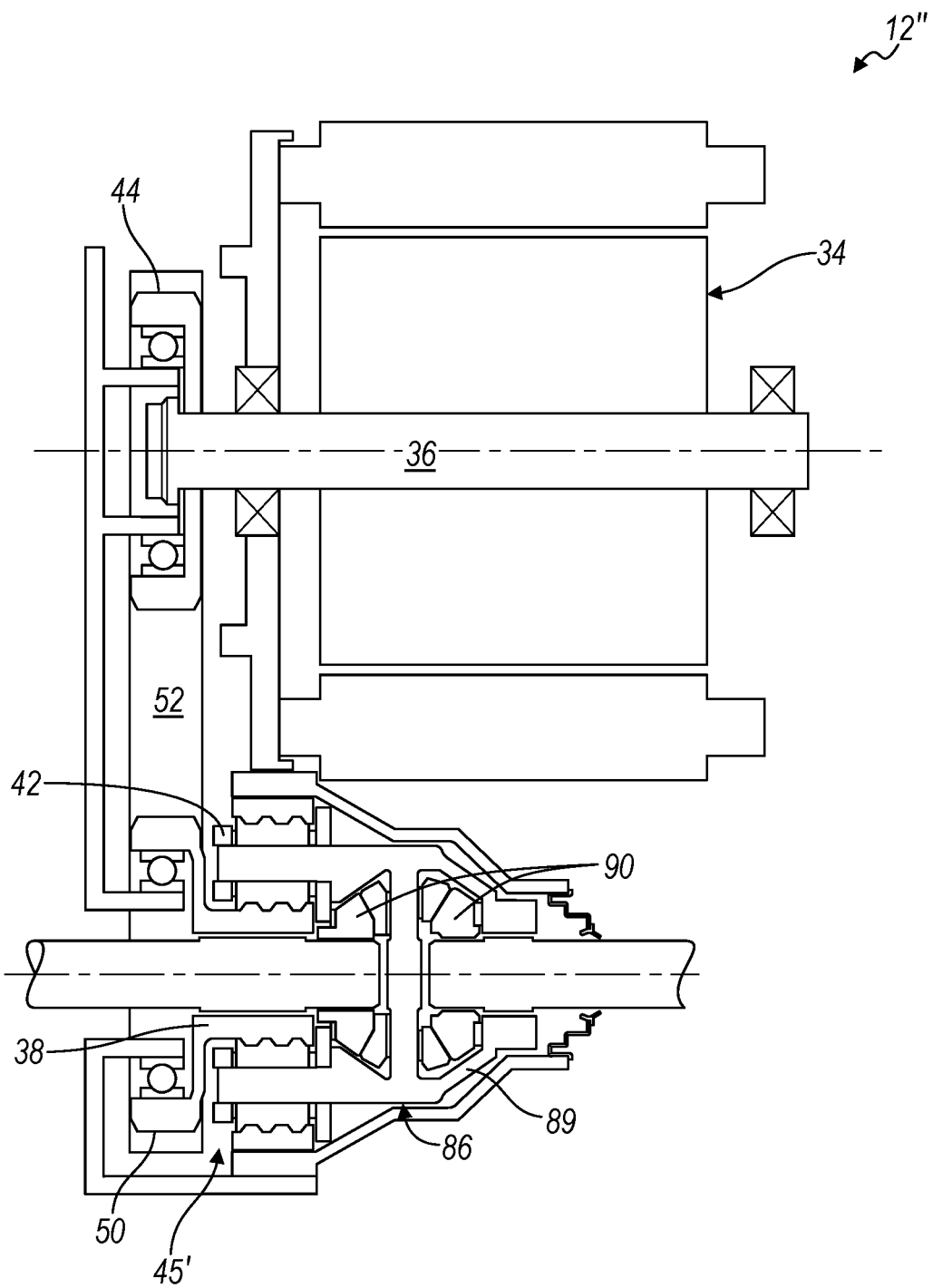
FIG. 6 is a cross-sectional view of an implementation of a vehicular drive unit.

FIG. 6 depicts another implementation of a vehicular drive unit 12". The vehicular drive unit 12" can include one electric motor 34, an input sprocket 44, an endless loop 52, an output sprocket 50, a planetary gearset 45', and a differential 86. The output shaft 36 of the electric motor 34 can be coupled to the sprocket 44. The first planetary gearset 45' can have an input 38 that is coupled to the output sprocket 50. The input sprocket 44 and output sprocket 50 can be rotatably linked by the endless loop 52, such as a belt or a chain. The output 42 of the first planetary gearset 45' can be coupled to the differential 86. The differential 86 can include an input 88 that couples to the output 42 of the first planetary gearset 45 and outputs 90 that ultimately connect to the wheels 14 of the BEV 10. The differential 86 can be coupled to two or more wheels 14 of the BEV 10 and transmit rotational torque from the electric motor 34 to the wheels 14. In this implementation, a single planetary gearset can be used.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

What is claimed is:

1. A vehicular drive unit for a battery electric vehicle (BEV), comprising:
   an electric motor, for propelling the BEV, having an output shaft;
   a first planetary gearset, having an input and an output, coaxial with the output shaft of the electric motor;
   a sprocket coupled to the output of the first planetary gearset;
   a second planetary gearset, having an input and an output, coaxial with a driveshaft of the BEV; and
   an endless loop rotatably coupled with the sprocket, and the input of the second planetary gearset, such that the output of the second planetary gearbox is coupled to the driveshaft of the BEV thereby configured to transmit rotational movement of the output shaft of the electric motor to the drive shaft of the BEV, wherein an axis of rotation of the drive shaft of the BEV is offset from an axis of rotation of the output shaft of the electric motor and wherein the vehicular drive unit consists of a single electric motor driving one or more wheels of the vehicle.

2. The electrically-powered vehicular drive unit recited in claim 1, further comprising a differential coupled to an output of the planetary gearset.

3. A vehicular drive unit for a battery electric vehicle (BEV), comprising:
   an electric motor, for propelling the BEV, having an output shaft;
   a first planetary gearset, having an input axially coupled with the output shaft of the electric motor, and an output;
   a second planetary gearset, having an input, and an output coupled to a differential of the BEV; and
   an endless loop rotatably coupled with the output of the first planetary gearset and the input of the second planetary gearset, wherein the differential of the BEV is offset from the shaft of the electric motor and wherein the vehicular drive unit consists of a single electric motor driving two or more wheels of the vehicle.

4. A vehicular drive unit for a battery electric vehicle (BEV), comprising:
   a first electric motor, for propelling the BEV, having an output shaft;
   a first planetary gearbox coupled to the output shaft of the first electric motor via an endless loop and configured to couple with a first driveshaft that drives a first wheel of the BEV, wherein the first electric motor solely drives the first wheel of the BEV;
   a second electric motor, for propelling the BEV, having an output shaft; and
   a second planetary gearbox, coupled to the output shaft of the second electric motor via another endless loop, configured to couple with a second driveshaft that drives a second wheel of the BEV, wherein the second electric motor solely drives the second wheel of the BEV, the output shaft of the first electric motor is offset from the first driveshaft, and the output shaft of the second electric motor is offset from the second driveshaft.

* * * * *